(12) United States Patent
Cignetti et al.

(10) Patent No.: US 10,223,538 B1
(45) Date of Patent: Mar. 5, 2019

(54) PREVENTING PERSISTENT STORAGE OF CRYPTOGRAPHIC INFORMATION

(71) Applicant: Amazon Technologies, Inc., Reno, NV (US)

(72) Inventors: Todd Lawrence Cignetti, Auburn, VA (US); Robert Eric Fitzgerald, Herndon, VA (US); Andrew J. Doane, Vienna, VA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/078,336

(22) Filed: Nov. 12, 2013

(51) Int. Cl.
 *G06F 21/60* (2013.01)
 *G06F 9/455* (2018.01)
 *G06F 21/62* (2013.01)

(52) U.S. Cl.
 CPC ........ *G06F 21/602* (2013.01); *G06F 9/45558* (2013.01); *G06F 21/6209* (2013.01); *G06F 2009/45562* (2013.01); *G06F 2009/45587* (2013.01); *G06F 2221/2143* (2013.01)

(58) Field of Classification Search
 CPC ........... G06F 2009/45562; G06F 21/60; G06F 21/62; G06F 21/6209; G06F 21/6218
 USPC ................................................. 713/165, 193
 See application file for complete search history.

(56) References Cited

U.S. PATENT DOCUMENTS

| | | | |
|---|---|---|---|
| 6,711,263 B1 | 3/2004 | Nordenstam et al. | |
| 7,370,348 B1 | 5/2008 | Patel et al. | |
| 7,444,670 B2 * | 10/2008 | Berger | G06F 21/57 709/227 |
| 8,356,347 B2 * | 1/2013 | Berger | G06F 21/57 713/189 |
| 8,375,399 B2 * | 2/2013 | Peterson | G06F 9/4493 719/313 |
| 8,391,494 B1 | 3/2013 | Serenyl | |
| 8,694,781 B1 | 4/2014 | Griffin et al. | |
| 8,694,786 B2 * | 4/2014 | Augu | G06F 21/57 380/227 |
| 8,819,420 B1 | 8/2014 | McKeeman et al. | |
| 8,924,720 B2 * | 12/2014 | Raghuram | H04L 9/0825 713/150 |
| 8,977,842 B1 | 3/2015 | McCorkendale et al. | |

(Continued)

OTHER PUBLICATIONS

Chen, "A Fast RPC System for Virtual Machines", IEEE Transactions on Parallel and Distributed Systems 24:7, Jul. 2013, IEEE, pp. 1267-1276.

(Continued)

*Primary Examiner* — Linglan E Edwards
(74) *Attorney, Agent, or Firm* — Davis Wright Tremaine LLP

(57) ABSTRACT

Organizations maintain and generate large amounts of sensitive information using computer hardware resources and services of a service provider. Furthermore, there is a need to be able to delete large amounts of data securely and quickly by encrypting the data with a key and destroying the key. To ensure that information stored remotely is secure and capable of secure deletion, cryptographic keys used by the organization should be prevented from being persistently stored during serialization operations. A variety of methods may be used to protect access to keying material and prevent the keying material from being stored persistently.

22 Claims, 11 Drawing Sheets

(56) References Cited

U.S. PATENT DOCUMENTS

| | | | |
|---|---|---|---|
| 9,239,909 B2* | 1/2016 | Tedesco | G06F 21/00 |
| 9,252,946 B2* | 2/2016 | Ranghuram | H04L 9/0825 |
| 9,418,220 B1 | 8/2016 | McKee et al. | |
| 9,881,168 B2* | 1/2018 | Chari | H04L 63/105 |
| 2002/0120574 A1* | 8/2002 | Ezaki | G06Q 30/06 |
| | | | 705/51 |
| 2003/0120598 A1 | 6/2003 | Lam et al. | |
| 2003/0147536 A1 | 8/2003 | Andivahis et al. | |
| 2003/0217159 A1 | 11/2003 | Schramm-Apple et al. | |
| 2004/0120525 A1 | 6/2004 | Miskimmin et al. | |
| 2005/0033970 A1 | 2/2005 | Anson et al. | |
| 2006/0041510 A1 | 2/2006 | Gagnon et al. | |
| 2006/0256105 A1 | 11/2006 | Scarlata et al. | |
| 2007/0038857 A1 | 2/2007 | Gosnell | |
| 2007/0067644 A1 | 3/2007 | Flynn et al. | |
| 2007/0226786 A1* | 9/2007 | Berger | G06F 21/57 |
| | | | 726/9 |
| 2008/0049933 A1 | 2/2008 | Kuroda | |
| 2008/0098018 A1 | 4/2008 | King et al. | |
| 2008/0171578 A1 | 7/2008 | Tysowski | |
| 2008/0226081 A1 | 9/2008 | Terao | |
| 2008/0256354 A1 | 10/2008 | Blumenau | |
| 2009/0037735 A1 | 2/2009 | O'Farrell et al. | |
| 2009/0092252 A1 | 4/2009 | Noll et al. | |
| 2009/0106801 A1 | 4/2009 | Horii | |
| 2009/0144557 A1 | 6/2009 | Sutton | |
| 2009/0183173 A1 | 7/2009 | Becker et al. | |
| 2009/0282262 A1 | 11/2009 | Nonoyama et al. | |
| 2009/0282266 A1 | 11/2009 | Fries et al. | |
| 2010/0017596 A1 | 1/2010 | Schertzinger | |
| 2010/0107176 A1 | 4/2010 | Kessler | |
| 2010/0169639 A1 | 7/2010 | Jeffries et al. | |
| 2010/0215133 A1 | 8/2010 | Stebbings et al. | |
| 2010/0217977 A1 | 8/2010 | Goodwill et al. | |
| 2011/0037759 A1 | 2/2011 | Fukuda | |
| 2011/0066786 A1 | 3/2011 | Colbert | |
| 2011/0138168 A1* | 6/2011 | Peterson | G06F 9/4493 |
| | | | 713/150 |
| 2011/0150221 A1 | 6/2011 | Kitada et al. | |
| 2011/0179412 A1 | 7/2011 | Nakae et al. | |
| 2011/0283352 A1* | 11/2011 | Berger | G06F 21/57 |
| | | | 726/16 |
| 2011/0296440 A1 | 12/2011 | Laurich et al. | |
| 2012/0131057 A1* | 5/2012 | Youn et al. | 707/781 |
| 2012/0204030 A1 | 8/2012 | Nossik et al. | |
| 2012/0204032 A1 | 8/2012 | Wilkins et al. | |
| 2012/0221444 A1 | 8/2012 | Bowes et al. | |
| 2012/0284330 A1 | 11/2012 | Figueroa | |
| 2012/0303968 A1 | 11/2012 | Balinsky et al. | |
| 2013/0061219 A1* | 3/2013 | Jerbi | G06F 21/577 |
| | | | 718/1 |
| 2013/0086383 A1* | 4/2013 | Galvao de Andrade | |
| | | | H04L 9/0897 |
| | | | 713/171 |
| 2013/0086394 A1 | 4/2013 | Shimmitsu | |
| 2013/0097369 A1 | 4/2013 | Talagala et al. | |
| 2013/0132690 A1 | 5/2013 | Epstein | |
| 2013/0148669 A1 | 6/2013 | Noguchi et al. | |
| 2013/0152079 A1 | 6/2013 | Heyman et al. | |
| 2013/0173900 A1 | 7/2013 | Liu | |
| 2013/0185810 A1 | 7/2013 | Suchter et al. | |
| 2013/0191924 A1* | 7/2013 | Tedesco et al. | 726/26 |
| 2013/0268931 A1 | 10/2013 | O'Hare et al. | |
| 2014/0052933 A1 | 2/2014 | Mace | |
| 2014/0089658 A1* | 3/2014 | Raghuram | H04L 9/0825 |
| | | | 713/155 |
| 2014/0095868 A1 | 4/2014 | Korthny et al. | |
| 2014/0164774 A1 | 6/2014 | Nord et al. | |
| 2014/0245296 A1* | 8/2014 | Sethuramalingam et al. | 718/1 |
| 2014/0258716 A1 | 9/2014 | MacMillan et al. | |
| 2014/0298022 A1 | 10/2014 | Proennecke et al. | |
| 2014/0366019 A1 | 12/2014 | Bajaj et al. | |
| 2015/0082031 A1* | 3/2015 | Ranghuram | H04L 9/0825 |
| | | | 713/167 |

OTHER PUBLICATIONS

Taleb et al., "EASE: EPC as a Service to Ease Mobile Core Network Deployment over Cloud," IEEE Network, Apr./Mar. 2015, pp. 78-88.

* cited by examiner

PREVENTING PERSISTENT STORAGE OF CRYPTOGRAPHIC INFORMATION

CROSS-REFERENCE TO RELATED APPLICATIONS

This application incorporates by reference for all purposes the full disclosure of: co-pending U.S. patent application Ser. No. 14/078,351, filed concurrently herewith, entitled "PREVENTING PERSISTENT STORAGE OF CRYPTOGRAPHIC INFORMATION USING SIGNALING" and co-pending U.S. patent application Ser. No. 14/078,360, filed concurrently herewith, entitled "SECURE DATA DESTRUCTION IN A DISTRIBUTED ENVIRONMENT USING KEY PROTECTION MECHANISMS."

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

In this type of distributed computing resource environment, a variety of operations such as serialization, may expose sensitive information to risks during storage and transmission over networks. Customers of the service provider may execute computer system instances on hardware of the service provider and these instances may contain sensitive information. Serialization of instances may jeopardize the sensitive information contained in the instance, by causing the information to be stored persistently. These types of risks can create difficulties in managing secret information of a customer that is contained in instances.

BRIEF DESCRIPTION OF THE DRAWINGS

Various embodiments in accordance with the present disclosure will be described with reference to the drawings, in which.

DETAILED DESCRIPTION

Figure 1:
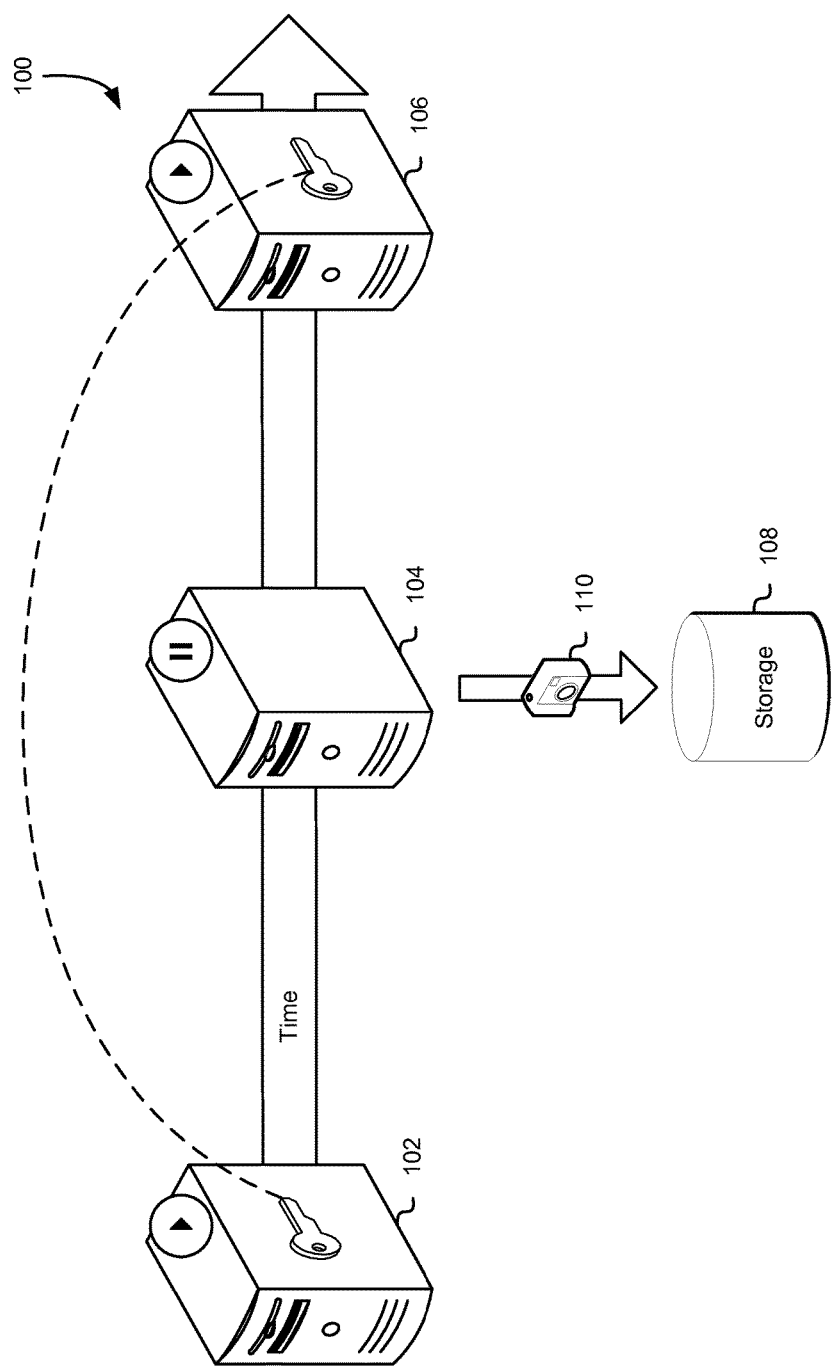
FIG. 1 shows a diagram illustrating various aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for data security in a manner that reduces risks associated with data transmission and/or storage. In various embodiments, plaintext cryptographic keys (also referred to simply as keys) are prevented from being written to persistent memory when various actions are performed on resources provided by a computing resource service provider (hereinafter service provider). Users of a service provider (and users of distributed systems, in general) may have large amounts of distributed data (e.g., data stored in more than one location over a network or several interconnected computers) which may make deleting this data difficult. Generally for the purpose of efficiency and security, it may be desirable to encrypt this data with one or more keys. Then once the data is to be deleted, the user may simply destroy the keying material. Destroying the keying material for encrypted data may be equivalent to destroying the data itself, since encrypted data is indecipherable without the corresponding keying material.

In various embodiments, the data described above may be generated, managed or stored using virtual machine instances (also referred to as instances). These instances may be executed using resources operated by the service provider. Techniques described herein are also applicable to physical computer systems, such as desktop computers. Aspects of the present disclosure may be used to protect the keys of various other computer systems that may have keying material exposed due to serialization or transmission over a network. These computer systems may have plaintext representations of various keys used to encrypt data for storage or other operations that may require data protection. In order to preserve the user's ability to delete the keying material and other sensitive data, thereby ensuring destruction of the data, plaintext representations of the keying material used by the virtual machine instances must not be written to persistent storage. Through a hypervisor, the user may indicate keying material or other sensitive information to be deleted and the hypervisor may selectively delete the keying material or other sensitive information directly. Preventing persistent storage of keys may also help ensure the user's data security. Various serialization events may occur during the operation of the instances that may lead to writing keys to storage or transmission of keying material. Generally, serialization may include the translation of one or more data structures of a computer system into a format suitable for persistent data storage. A command to execute serialization may be generated automatically such as when performing periodic snapshots, or a command may be generated explicitly such as by an instance requesting suspension.

In various embodiments, users of the service provider may operate one or more computer systems. The computer systems may incorporate resources or services of the service provider to perform various operations. The users may employ one or more cryptographic keys in order to keep information secret and may not wish to expose the keys to the service provider or any other third party, thereby exposing the user's secret information. Various techniques may be used to ensure the information is kept secret. For instance, the user's computer system may register function calls with the service provider, the function call may operate to ensure plaintext copies of the keys are not written to persistent storage or transmitted over a network and copies of the keys are restored to the computer system when required. A first function may be registered to delete copies of the keys from computer system memory before it is serialized and a second function may be registered to restore copies of the keys to the computer system memory when the computer system is deserialized. Various signaling methods may be used to signal to the computer system that a serialization event will occur and allow the computer system to take the necessary steps to protect any cryptographic keys that may be contained in memory.

In various other embodiments, the computer system or a system of the service provider, may designate a particular area of memory for key storage and ensure the memory area is not serialized during one or more serialization operations. Furthermore, a signaling method may be used to indicate to the computer system that a serialization event will occur, and a time out period may be used to allow the computer system time to ensure that no plaintext representations of the keys are outside the designated memory area. The service provider may also encrypt the designated area of memory before one or more serialization operations of the particular serialization event occurs in order to ensure that secret information is not exposed. In order to ensure that keying material is not exposed to the service provider or another party, various security modules may be used, such as a Trusted Platform Module (TPM) or Hardware Security Module (HSM). These types of cryptographic key management devices may generate keying material for the computer systems and restore the keying material during deserialization. The security modules may be operated by the user or the service provider and may be virtualized in various embodiments. The service provider may also maintain an audit log in order to track actions performed and ensure that serialized data lacks any plaintext representations of keys used by instances.

FIG. 1 is an illustrative example of an environment 100 illustrating various aspects of the present disclosure. As noted above, techniques described herein are applicable to ensuring data destruction and data security using cryptographic keys. Accordingly, FIG. 1 shows a computer system instance 102 with one or more cryptographic keys stored in memory of the instance. The computer system instance may be managed by a hypervisor (also referred to as a virtual machine manager or virtual machine monitor), with the hypervisor operated by the service provider. At some point in time during the operation of the computer system instance a serialization event 104 may be detected. In various other embodiments, the hypervisor or some other service of the service provider may determine that a serialization event will occur. The serialization event 104 may be, for example, a snapshot of the computer system. Snapshots may be performed at periodic intervals (e.g. as periodic backups), the keys may be removed from instance memory prior to the snapshot and restored after the snapshot operation is complete, so as to prevent serialization of the keys. The serialization event 104 may cause instance data 110 to be written persistently to storage 108. At some point in time before serialization event 104, one or more various techniques may be used to ensure that the one or more cryptographic keys stored in memory of instance 102 are not included in instance data 110 when it is written to storage 108.

A hypervisor managing the instance 102, in various embodiments, exposes one or more functions to the instance 102 in order to enable instance 102 to delete cryptographic material before instance data is serialized. The hypervisor may call one or more functions before serializing the data. Furthermore, the hypervisor may wait for a response from the instance 102 indicating that the keys have been deleted before proceeding with serialization. A timeout period (also referred to as a grace period), for the response from the instance 102 may be set such that at the end of the timeout period the instance is serialized even if no response has been received. The keys of the instance 102 may also be encrypted in order to protect secret information during serialization. The keys may be encrypted by the hypervisor during serialization, the instance before serialization or some other suitable system of the service provider. The hypervisor may also communicate with the instance 102 and establish an area of memory which the hypervisor will not serialize during serialization of the instance 102.

At some point in time after the serialization event 104 is completed, the computer system instance may be deserialized using instance data 110 retrieved from storage 108. Using the example above, at some point in time after the snapshot is created the computer system instance may be launched using the created snapshot. The instance data 110 may not contain the one or more cryptographic keys contained in memory of instance 102 and in order for the instance 106 to function as it did before the serialization event 104, the keys must be restored. The instance 106 may be responsible for restoring the one or more cryptographic keys, or the hypervisor may replace the keys before launching the instance 106. In various embodiments, a security module may be used to manage the one or more keys of the instance. For example, the HSM or TPM may be used to restore keys when the instance 106 is launched. For example, once all the instance data 110 is retrieved from storage 108 and loaded into memory, the hypervisor may transmit a request to an HSM to restore the keys of the instance 106.

Figure 2:
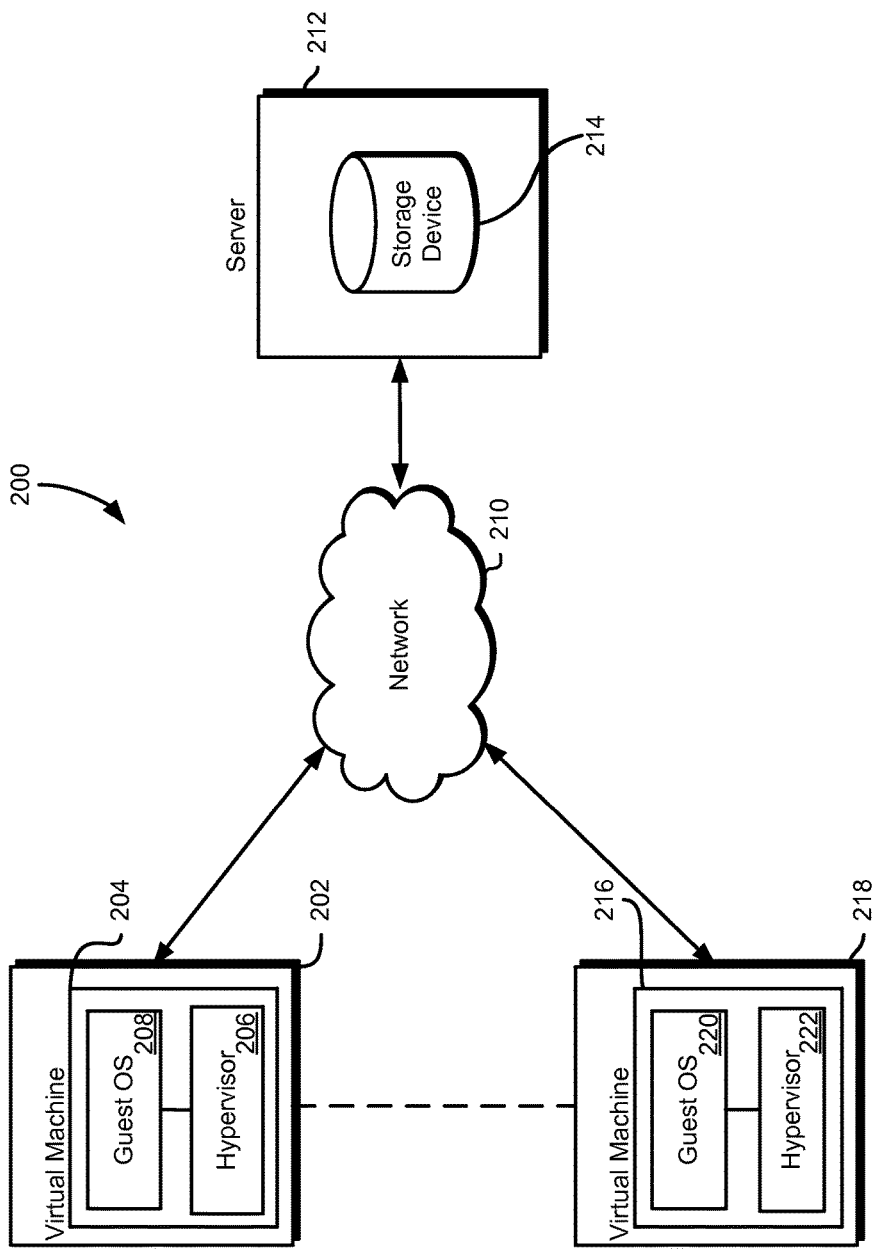
FIG. 2 shows a diagram illustrating various aspects of the present disclosure.

FIG. 2 is an illustrative example of an environment 200 illustrating, various aspects of the present disclosure. Accordingly, FIG. 2 shows computer systems (also referred to as a physical host) 202 and 218, may be a physical host or other suitable computing device located in one or more data centers. Computer system 202 may be in a distinct geographic location from computer system 218. For example, computer system 202 may be in a different legal jurisdiction from computer system 218. Physical hosts 202 and 218 may each operate multiple virtual machines 204 and 216, although for clarity only one is shown. The physical hosts 202 and 218 may manage the virtual machine with a hypervisor 208. The hypervisors 206 and 222 may control the guest operating systems (also referred to as a guest computer system) 208 and 220 interactions with the hardware of the physical host 202 and 218. The physical hosts 202 and 218 may be connected to a server 212 over a network 210. The server may contain one or more storage devices 214 (for clarity only one is shown) that may be used in various embodiments of the present disclosure, for serializing data corresponding to the guest operating systems 206 and 220.

During serialization operations, cryptographic keys of the guest operating systems 208 and 220 may be written persistently to storage device 214 and transmitted over network 210. To ensure protection of the cryptographic keys, various techniques described above may be used. For example, the hypervisors 206 may signal to the guest operating system 208 that serialization of data corresponding to the guest operating system will occur. The guest operating system 208 may then perform one or more operations to protect cryptographic keys contained in the guest operating system. The one or more operations may include deleting the cryptographic keys or encrypting cryptographic keys with a separate key. In various embodiments, the hypervisor 206 does not signal the guest operating system 208. For example, at some point during execution of the guest operating system 208, the hypervisor 206 and the guest operating system 208 may coordinate a particular area of memory which will be excluded from serialization during any serialization events. The particular area of memory may be virtual memory addressed by the virtual machine instance or physical memory of the underlying hardware executing the virtual machine instance.

Figure 3:
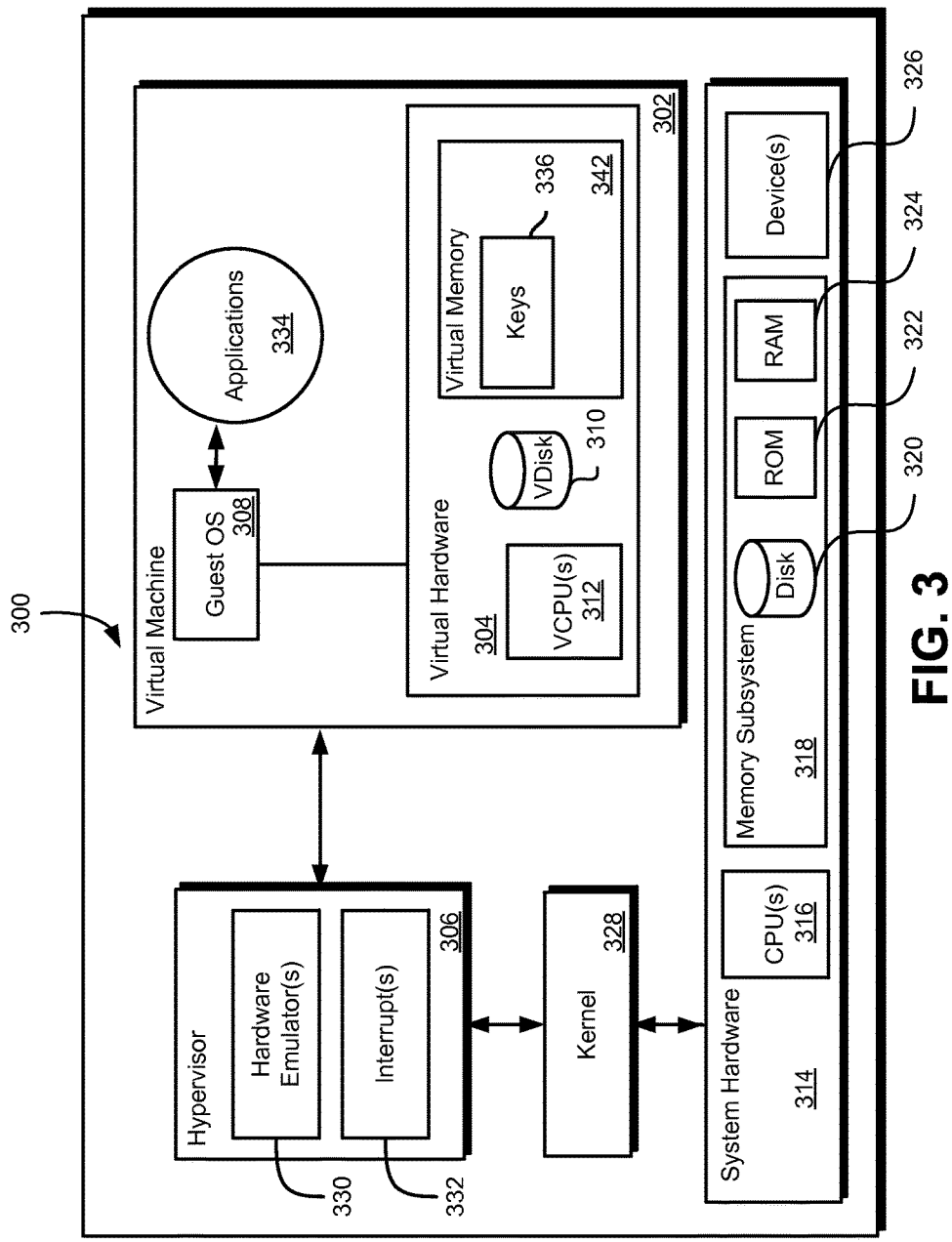
FIG. 3 shows an illustrative example of a device with which various embodiments can be practiced.

FIG. 3 is an illustrative, simplified block diagram of an example device 300 that may be used to practice at least one embodiment of the present disclosure. In various embodiments, the device 300 may be used to implement any of the systems illustrated herein and described above, such as the physical hosts described above in connection to FIG. 2. For example, the system 300 may be used to execute virtual machine instances, monitor the instances, manage the instance and perform one or more serialization operations. For example, the device 300 may execute a virtual machine instance 302 for a customer and enable the virtual machine to protect secret information during serialization. Although only one virtual machine is shown in FIG. 3 for clarity, the system may execute multiple virtual machines for one or more customers. As shown in FIG. 3, the device 300 may include system hardware 314, the system hardware includes one or more central processing units 316 (also referred to as a processor for simplicity) that may be communicatively coupled to a number of subsystems, such as the memory subsystem 318, and devices 326. Devices may be input/output devices, optical devices, networking devices or other suitable devices.

The memory subsystem 318 may provide a computer-readable storage medium for storing data that may provide the functionality of at least one embodiment of the present disclosure. The data stored in the memory subsystem (programs, code modules, instructions) that, when executed by one or more processors, may provide the functionality of one or more embodiments of the present disclosure, may be stored in the memory subsystem 318. These application modules or instructions may be executed by the one or more processors 316. The memory subsystem 318 may additionally provide storage for serialized data, that serialized data may be generated by a virtual machine 302. The memory subsystem 318 may comprise a disk storage subsystem 320. The disk 320 may be used to store data generated by the virtual machine 302, such as a serialized image of the virtual machine or information contained in the virtual disk 310 of the virtual machine 302. An image may be used to instantiate one or more computer systems. The memory subsystem 318 may include a number of memories including Random Access Memory (RAM) 324 and Read-Only Memory (ROM) 322.

The device 300 may further include a kernel 328. The kernel may manage requests from software, such as a hypervisor 306 and translate the requests into data instructions for the central processing unit 316 and memory subsystem 318. The hypervisor 306 may manage requests from virtual machine 302 and control virtual machine access to the underlying hardware. The hypervisor may also signal the virtual machine, using one or more interrupts 332, according to various aspects of the present disclosure. The interrupts 332 may be used to transmit signals to the virtual machine 302. The interrupts may be used indicate a variety of information such as information corresponding to the functions which the hypervisor exposes to the virtual machine 302. The functions may further enable the hypervisor to coordinate with the virtual machine instance and prevent storage of the plaintext representation of the keys. The virtual machine 302 may register the exposed functions with the hypervisor 306, registering the functions may include providing information on when to call the functions and conditions for calling the functions and continuing execution of the virtual machine instance if a function fails. This information may be stored in metadata corresponding to the virtual machine instance 302, the metadata of the virtual machine instance may be stored in the memory subsystem 318.

The hypervisor may also include one or more hardware emulators 330 and interrupts 332, the hardware emulators may provide virtualized hardware to the virtual machine. In various embodiments, hardware emulator 330 is used to signal the virtual machine that a serialization event will occur. For example, the hypervisor 306 may use the hardware emulator 330 to create a virtual device driver and signal the virtual machine 302 using the device driver. The hypervisor 306 may be a bare metal hypervisor as shown in FIG. 3 or a hosted hypervisor running as an application within a client operating system. The interrupts 332 may be used in signaling the guest operating system 308.

As described above, the hypervisor 306 manages the virtual machine 302. The virtual machine 302 contains virtualized hardware 304, the virtualized hardware includes one or more virtual central processing units 312, virtual memories 342 and virtual disks 310. The virtual machine also executes a guest operating system 308 with one or more applications 334. The virtual machine 302 may also contain one or more cryptographic keys 336 for use by the guest operating system 308 in protecting secret information. The virtual machine may have access to the keys 336 stored in memory and other keys stored in a security module (not shown in FIG. 3) or some other secure location. The keys 336 may be stored in an ephemeral key area that is guaranteed by one or more systems of the service provider, not to be written to persistent storage. The keys 336 may be stored in contiguous or non-contiguous areas of memory. The area(s) of memory may be protected by the guest operating system 308, where the guest operating system may limit or prevent access to those memory area(s) which contain plaintext representations of cryptographic keys using a trap or other similar mechanism to control access to the memory areas. For example, access to the keys 336 by applications 334 may be limited by the guest operating system 308. The guest operating system may intervene when an application requests read access to the keys and block the requested access. The guest operating system 308 may allow encryption or decryption using the keys. The particular areas of memory that contain encryption keys may be excluded from serialization. The particular memory areas which contain the keys 336, may be determined by the guest operating system 308 or the hypervisor 306. The hypervisor 306 or some other service responsible for serializing the virtual machine 302 may exclude the ephemeral key area or keys 336 from serialized data during a serialization event.

Figure 4:
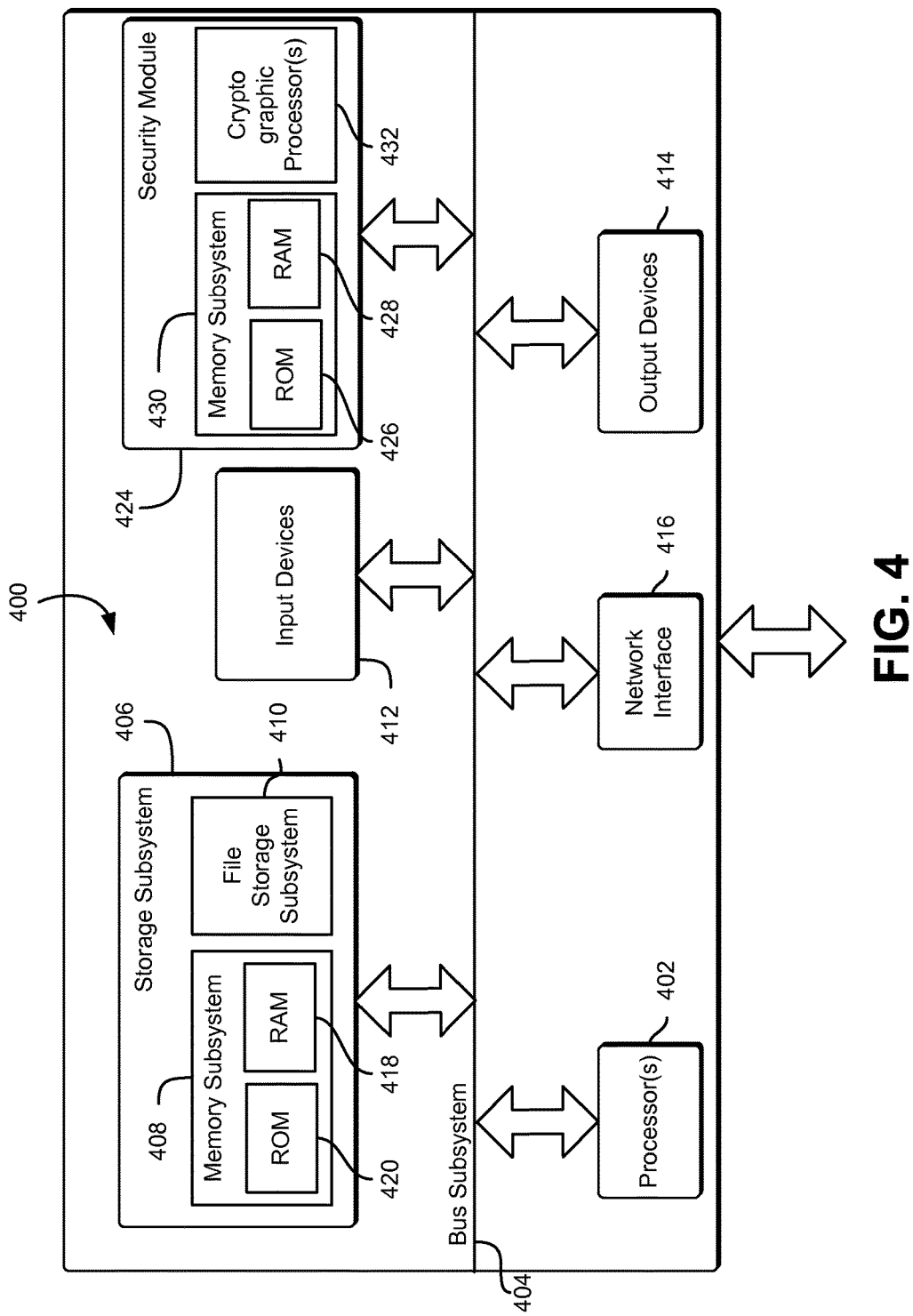
FIG. 4 shows an illustrative example of a device with which various embodiments can be practiced.

FIG. 4 is an illustrative, simplified block diagram of an example device 400 that may be used to practice at least one embodiment of the present disclosure. In various embodiments, the device 400 may be used to implement a variety of the systems illustrated herein, such as the hardware security module described below in connection to FIG. 5. For example, the system 400 may be used to manage cryptographic keys, such as restoring key state after an instance is resumed or providing a master key for encrypting instance data. As shown in FIG. 4, the device 400 may include one or more processors 402 that may be configured to communicate with and are operatively coupled to a number of peripheral subsystems via a bus subsystem 404. These peripheral subsystems may include a storage subsystem 406, comprising a memory subsystem 408 and a file storage subsystem 410, one or more input devices 412, one or more output devices 414, a network interface 416, a security module 424, comprising a memory subsystem 430 and one or more cryptographic processors 432.

The bus subsystem 404 may provide a mechanism for enabling the various components and subsystems of system 400 to communicate with each other as intended. Although the bus subsystem 404 is shown schematically as a single bus, alternative embodiments of the bus subsystem may utilize multiple busses.

The network interface 416 may provide an interface to other systems and networks. The network interface 416 may serve as an interface for receiving and transmitting data to and from other systems from system 400. For example, the network interface 416 may allow the security module to communicate with various components of device 300 described above, such as the hypervisor 306 or the guest operating system 308, in order to retrieve one or more keys for use with the virtual machine instance. For example, as will be illustrated in FIG. 5, the hypervisor may request the one or more keys of the guest operating system to be restored when the instance is deserialized. Additionally, the guest operating system may submit a request to the security module to have copies of cryptographic keys restored. The network interface 416 may also facilitate the receipt and/or transmission of data on other networks, such as an organizations intranet.

The input devices 412 may include one or more buttons, a keyboard, pointing devices such as an integrated mouse, trackball, touchpad, or graphics tablet, a scanner, a barcode scanner, a fingerprint scanner, a retinal scanner, a touch screen incorporated into the display, audio input devices such as voice recognition systems, microphones and other types of input devices. In general, use of the term input device is intended to include all possible types of devices and mechanisms for inputting information to the system 400.

The output devices 414 may include a display subsystem, a printer or non-visual displays such as audio output devices, etc. The display subsystem may be a Cathode Ray Tube (CRT), a flat-panel device such as a Liquid Crystal Display (LCD), Light Emitting Diode (LED) display or a projection or other display device. In general, use of the term output device is intended to include all possible types of devices and mechanisms for outputting information from the system 400. The output devices 414 may be used, for example, to present user interfaces to facilitate user interaction with applications performing processes described herein and variations therein, when such interaction may be appropriate.

The storage subsystem 406 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure and may be stored in the storage subsystem 406. These application modules or instructions may be executed by the one or more processors 402. The storage subsystem 406 may additionally provide a repository for storing data used in accordance with the present disclosure. The storage subsystem 406 may comprise of a memory subsystem 408 and a file/disk storage subsystem 410.

The memory subsystem 408 may include a number of memories including a main RAM 418 for storage of instructions and data during program execution and a ROM 420 in which fixed instructions may be stored. The file storage subsystem 410 may provide a non-transitory persistent (non-volatile) storage for program and data files, and may include a hard disk drive, a floppy disk drive along with associated removable media, a Compact Disk Read-Only Memory (CD-ROM) drive, an optical drive, removable media cartridges and other like storage media.

The security module 424 includes a memory subsystem 430, including a main RAM 428 for storage of instructions and data during program execution and a ROM 426 in which fixed cryptographic information or program instructions may be stored, such as a root key or user private key. The device 400 may also store keys in RAM 428 for temporary cryptographic processing. The cryptographic information stored in the memory subsystem 430 or the one or more cryptographic processors 432 may be used to generate cryptographic keys for use with one or more virtual machines. The one or more cryptographic processors may be used to accelerate cryptographic processing in the device and may include a random number generator, RSA key generator, SHA-1 hash generator and an encryption-decryption-signature engine. User credentials of a virtual machine or guest operating system may be stored temporarily in the memory subsystem 430 for use in authentication with the service provider and/or restoring cryptographic keys. The security module may maintain key information for the one or more virtual machines, such that if the keys are deleted or encrypted during serialization the key may be restored.

Figure 5:
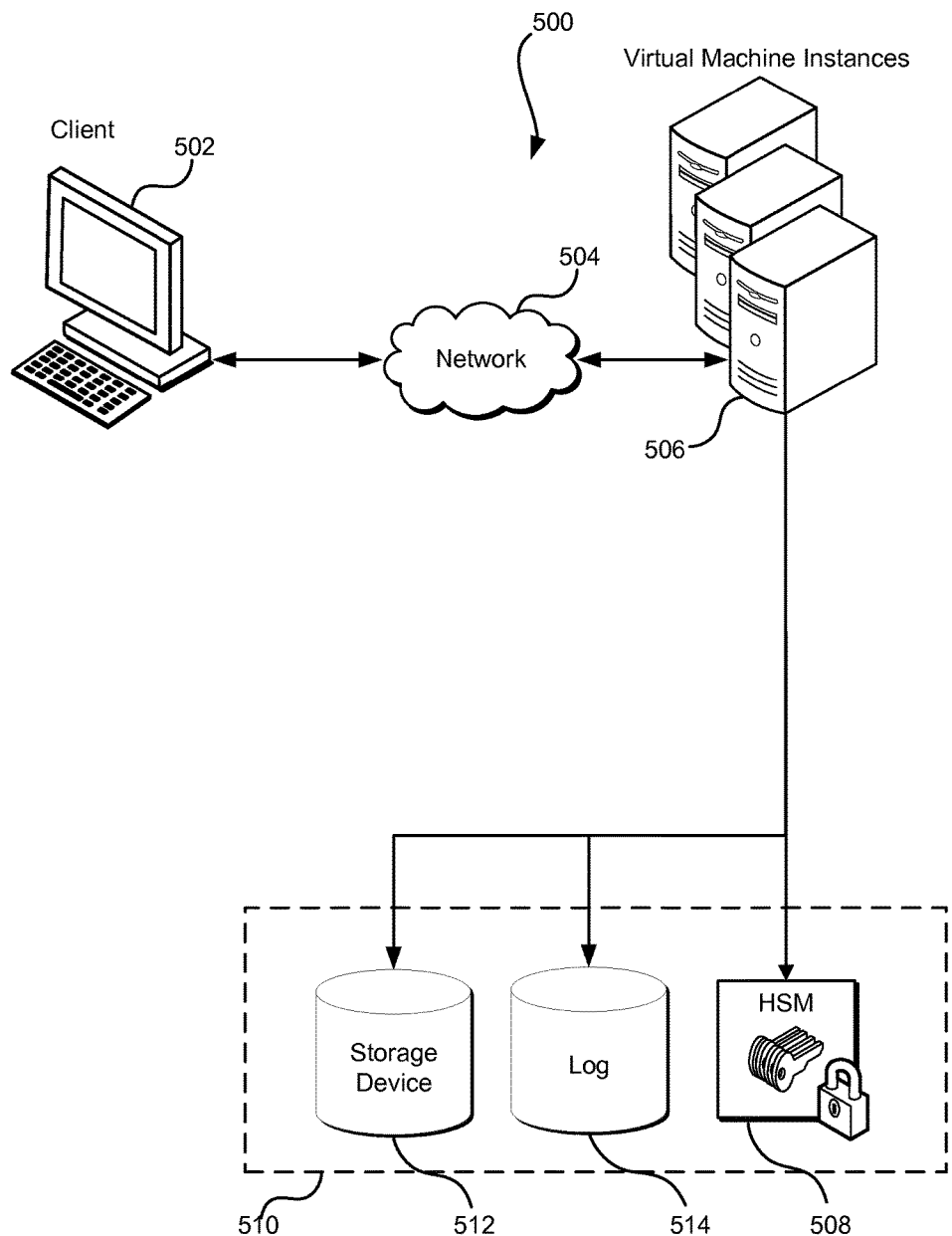
FIG. 5 shows a diagram illustrating various aspects of the present disclosure.

FIG. 5 is an illustrative example of an environment 500 illustrating various aspects of the present disclosure. Accordingly, FIG. 5 shows a client 502 communicating with one or more virtual machine instances 506 over a network 504, such as the internet. The virtual machines 506 may be offered as a service of the service provider and the customer may manage various aspects of the virtual machines through a management console operated by the service provider. The management console provides the customer with an interface to manage resources and services provided by the service provider, such as virtual machine instances. For example, a customer through the management console may communicate directly with a hypervisor and instantiate a virtual machine instance. The virtual machine instances 506 may be connected to various systems to enable protection of cryptographic keys in accordance with the present disclosure. A key protection system 510 may include a hardware security module 508, a log 514 and a storage device 512. The log 514 may be used to create an audit log to ensure that the cryptographic keys of the virtual machines have not been exposed.

During operation of the virtual machine instances 506, a serialization event may be detected and one or more operations may be performed to prevent plaintext representations of keys contained in the virtual machines from being stored persistently. For example, as described above in connection with FIG. 3, the hypervisor 306 may call a function that when performed by the guest operating system 308, may delete the keys 336 stored in memory. Information corresponding to the function called by the hypervisor, operations performed by the guest operating system, information indicating whether the operations performed were completed successfully or any other information suitable for determining the keys have not been exposed may be written to the log 514. The log 514 may be signed by the service provider, using the service provider private key. The log 514 may also be used to ensure data destruction, to be discussed in further detail below in connection to FIG. 10. The storage device 512 may be used to store information about the instance 506 or serialized instance data. In various embodiments, the storage device 512 contains data to be decrypted or encrypted by the hardware security module 508 also referred to as a cryptographic key management module.

The hardware security module 508 may be a physical device connected in a data center operated by the service provider or the hardware security module may be virtualized and executed as a service of the service provider. The hardware security module 508 may securely store keys for one or more instances 506 without sharing the keys with other instances or clients. In various embodiments, key management techniques are used by the hardware security module to manage encryption keys throughout the key lifecycle (generation, secure use, storage, escrow and destruction). For example, using key management techniques, the client 502 may effectively delete a large data set from storage device 512 by submitting a request to the hardware security module 508 to destroy the key used to encrypt the data set.

The hardware security module 508 may be logically separate from the other systems and services of the service provider to ensure confidentiality and protection of the keys. In various embodiments, the client 502 or the virtual machine instances 506 may store generated keys using another system or service and store the generated keys securely in the hardware security module 508. The keys stored in the hardware security module may only be accessed using valid credentials. The hardware security module may validate the provided credentials using a variety of techniques and prevent access to keys by parties who have not been validated. In various embodiments, the hardware security module 508 generates keys and performs encryption and decryption using the keys within the hardware security module without the keys ever leaving the hardware security module, enabling the hardware security module to control, store and use the encryption keys without the keys being copied.

In various embodiments, data destruction is accomplished by destroying keys that are stored in the hardware security module and have never left the protected boundary of the hardware security module. The techniques described in the present disclosure are directed to key handling and preventing persistent storage of plaintext keys, and any chain of keys that may be encrypted by a master key stored in the hardware security module, data destruction of large data sets can be accomplished simply by destroying a single master key stored in the hardware security module. Hardware security modules may prevent keys from leaving the protected boundaries and may not be copied, enabling the master key stored in the hardware security module to be safely destroyed, thereby destroying the data encrypted by the master key.

The hardware security module may also be used to restore keys during deserialization of an instance. For example, the hypervisor may provide the hardware security module with credential information for a virtual machine instance being launched from a snapshot. If the snapshot has been encrypted by the hardware security module using a master key, the snapshot may be decrypted before launching the instance. Furthermore, if the keys inside the memory of the instance have been deleted or encrypted before serialization, the hardware security module may restore the instance keys as well. During serialization of instances, instance data may be written to storage device 512 and the hardware security module 508 may encrypt the entirety of the instance data or just a particular area of the instance data. For example, as described above, if the instance stores all of the keying material in a particular area of memory, the hardware security module may only encrypt that particular area of the memory.

Figure 6:
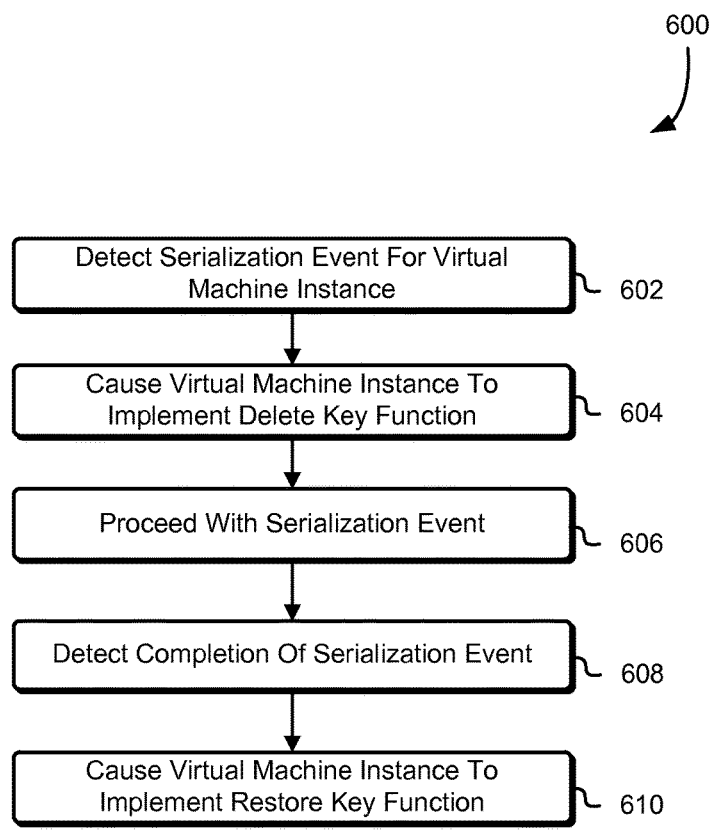
FIG. 6 shows an illustrative example of a process for processing a request in accordance with at least one embodiment.

FIG. 6 shows an illustrative example of process 600 which may be used to prevent exposure of plaintext cryptographic keys. The process 600 may be performed by any suitable system, such as by the device as described in connection with FIG. 3 and/or an appropriate component thereof, such as by the hypervisor 306. Returning to FIG. 6, in an embodiment, the process 600 includes detecting a serialization event for a virtual machine instance 602. For example, the hypervisor may detect that a serialization event, such as migration, has been initiated. Once a serialization of an instance is detected 602 a signal may be sent to the instance, enabling the instance to perform one or more operations to protect keys that may be stored in memory of the instance, such as implementing a delete key function 604. The delete key function may be registered with the hypervisor ahead of time such that once a serialization event is detected 602 the hypervisor may call the delete key function, thereby signaling the instance to implement the functions. In various embodiments, if the instance does not register callback functions, the hypervisor may proceed with a serialization event 606 without calling an instance function. Other signaling methods may be used to send signals in accordance with the present disclosure. For example, the hypervisor may send a signal to the instance using a special network port, a hardware interrupt signal, a unique pattern of input on a virtualized hardware device (e.g., USB port), instance metadata, exposing a uniform resource locator to the instance or any other suitable method for signaling an instance. Once the signal is received, the instance may destroy keys stored in instance memory by implementing the delete keys function. The hypervisor may use a grace period to allow the instance time to perform one or more operations before serialization of the instance data 606. In other embodiments, the instance may signal the hypervisor that the serialization of the instance may proceed 606, the instance may use any of the signaling methods as described above.

In various embodiments, the signal may include operations that when performed by the hypervisor, expose the one or more functions to the instance that allow the instance to register the one or more functions. At least one of the functions of the one or more functions being called just before the instance is serialized and at least one other function of the one or more functions being called just after the instance is serialized. The function may also be registered at some point in time before the serialization event is detected 602. At the time of registering these functions (also referred to as callback functions), the instance may also specify whether the hypervisor or some other system or service of the service provider should prevent the instance from being serialized in the event that the one or more of the functions times out or otherwise does not complete (e.g., block snapshot or migration on failure of the delete keys functions), or if the hypervisor should complete the serialization even if one or more of the functions do not complete. Returning to FIG. 6, process 600 may detect completion of the serialization event 608. For example, the hypervisor may receive notification from one or more services of the service provider that an image of the instance has successfully been written to disk. As described above, process 600 may be modified to require a response from the instance, however the process 600 may proceed without a response from the instance as a result of a grace period expiring. Upon completion of the one or more function calls executed before serialization, the response from the instance may be another function call indicating the delete keys function call was completed successfully.

Information regarding the instance and whether to proceed without receiving a response from the instance may be written to metadata corresponding to the instance. At some point in time after the hypervisor has detected completion of the serialization events 608, the hypervisor may cause the virtual machine instance to implement one or more functions to restore keys 610, such as restore keys function. For example, information regarding the instance registering the callback functions may be stored as a new data item in the instance metadata so that the hypervisor may check the metadata when restoring an instance to know whether or not the hypervisor is responsible for calling one or more functions to restore keys to the instance when reconstituting the instance. Information written into the metadata may include information about registered functions, location of keys, memory location for one or more keys, security module that manages the instance keys or other information usable with the techniques described in the present disclosure. Functions may be called by the hypervisor or other system of the service provider but may be executed by the instance 610. For example, the hypervisor may call a function signaling to the instance to delete keys stored in memory before serialization, and the function may be executed by the instance in order to protect the keys from exposure to the service provider. Information written into the metadata of the instance may indicate operations to be performed by the hypervisor or some other system in order to enable the instance to retrieve its keys. For example, an operation may be performed to restore an instance, the hypervisor may check the metadata to determine if the instance previously registered one or more functions with the hypervisor and if the one or more functions had been completed for the last serialization operation. If the instance had registered one or more functions and the registered functions were completed successfully, then the hypervisor may restore the instance and call any functions that may be registered to execute before handing over control to the instance.

Figure 7:
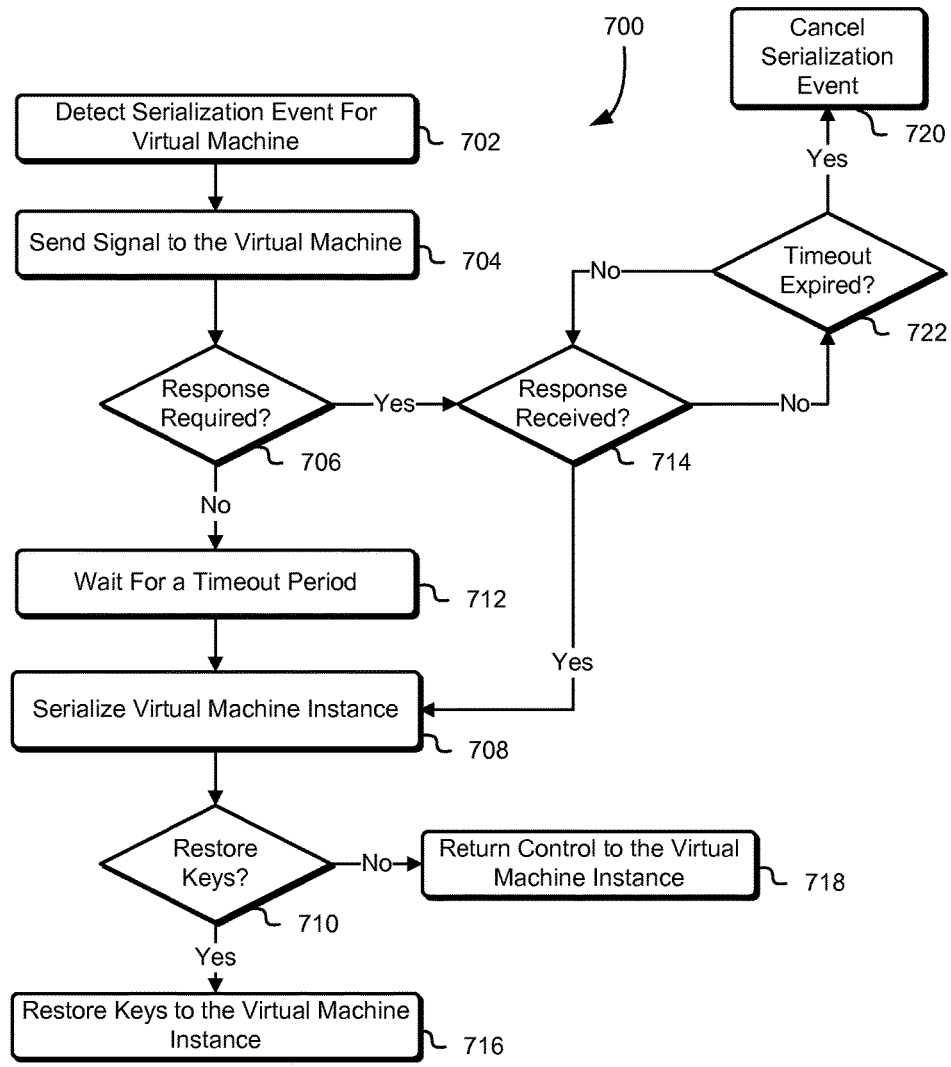
FIG. 7 shows an illustrative example of a process for processing a request in accordance with at least one embodiment.

FIG. 7 shows an illustrative example of process 700 which may be used to prevent exposure of plaintext cryptographic keys. The process 700 may be performed by any suitable system, such as by the device as described in connection with FIG. 3 and/or an appropriate component thereof, such as by the hypervisor 306. Returning to FIG. 7, in an embodiment, the process 700 includes detecting a serialization event for a virtual machine instance 702. Once the serialization event has been detected 702 by the hypervisor, the hypervisor may the send a signal to the virtual machine 704 for which the serialization event was detected. The signal 704 may be sent using any of the signaling methods described above. For example, the signal 704 may be an interrupt sent by the hypervisor through a device driver of the instance. The hypervisor may then determine if a response from the instance is required 706. The hypervisor may make the determination by checking the metadata of the instance. If there is no information indicating that a response is required, the process 700 may wait for a timeout period 712 and then proceed with serializing the virtual machine instance 708. The timeout period 712 may enable the virtual machine to perform, prior to serialization, one or more operations to ensure that plaintext representations of encryption keys stored in the virtual machine's memory are not written to persistent storage when the instance is serialized 708.

If a response to the signal 704 is required, process 700 may wait for a response to be received 714. If a response is received 714, process 700 may continue and serialize the virtual machine instance 708. If no response is received, process 700 may determine if a timeout period has expired 722. The timeout period may enable the virtual machine instance to perform operations in order to protect cryptographic keys and return a response to the hypervisor. In various embodiments, the timeout period may be set by the hypervisor when the virtual machine instance registers the delete keys function as described above. In numerous variations of process 700, the instance may allow serialization 708 to proceed at the expiration of the timeout period 722 regardless of the hypervisor receiving a response 714. In other variations to process 700, checking if a response has been received at step 714 may include an indication that the virtual machine instance was unable to perform one or more operations required to protect the cryptographic keys from being written persistently to storage and the serialization event must be canceled 720. Returning to FIG. 7, during the timeout period 722, if a response is received 714 the hypervisor may permit the serialization event to proceed 708. If no response is received 714 during the timeout period 722, the hypervisor may cancel the serialization event 720.

Once the virtual machine has been serialized 708, the instance may be relaunched. The hypervisor may, during restoration of the instance, check the instance metadata to determine if the keys for the instance should be restored 710 by the hypervisor. If the hypervisor is responsible for restoring the keys to the instance, the hypervisor may call the restore key function 716 before handing control over to the instance. If the hypervisor is not responsible for restoring the keys to the instance, the hypervisor may launch the instance and hand over control to the instance 718 without calling the restore keys function. In this case, the instance itself may be responsible for restoring its own keys.

Figure 8:
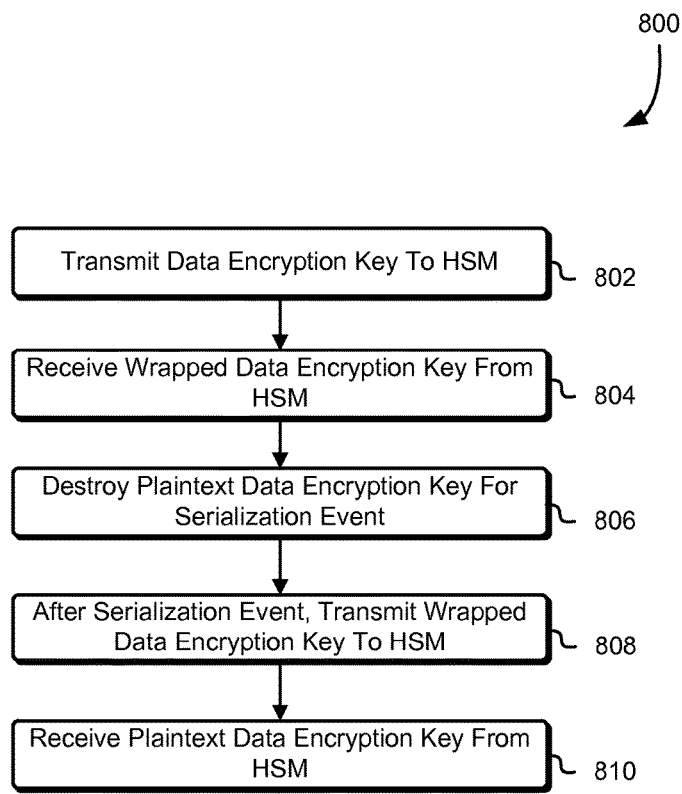
FIG. 8 shows an illustrative example of a process for processing a request in accordance with at least one embodiment.

FIG. 8 shows an illustrative example of process 800 which may be used to prevent exposure of plaintext cryptographic keys. The process 800 may be performed by any suitable system, such as by the device as described in connection with FIG. 3 and/or an appropriate component thereof, such as by the virtual machine 302. Returning to FIG. 8, in an embodiment, the process 800 includes transmitting encryption keys to a security module 802, such as a hardware security module. The instance may transmit the encryption keys as a result of receiving a signal from the hypervisor as described above. The security module may use a master key to wrap the encryption key. Wrapping the encryption key includes encrypting the plaintext version of the encryption key with another key. The instance may then receive the wrapped encryption key from the security module 804. The wrapped key may be stored in the memory of the instance and the instance may then delete or otherwise destroy any plaintext copies of the encryption key that may still be in memory 806. The security module in various embodiments, generates an audit log indicating that the received encryption keys have been securely encrypted and the log may be signed by the service provider, the customer, the instance or some combination thereof using the entities' corresponding private key.

In various embodiments, the instance may signal the hypervisor that the keys have been secured and allow the serialization of the instance to continue. After the serialization event the security module may receive the wrapped key 808. The hypervisor may transmit the encrypted key to the security module as an operation during restoration of the instance. In other embodiments, the instance may be responsible for restoring the key and transmit the key to the security module 808. The security module may decrypt the encryption key and transmit the plaintext copy of the encryption key to the instance 810. The security module may generate a log of activities performed in unwrapping the encryption key and transmitting it to the instance.

Figure 9:
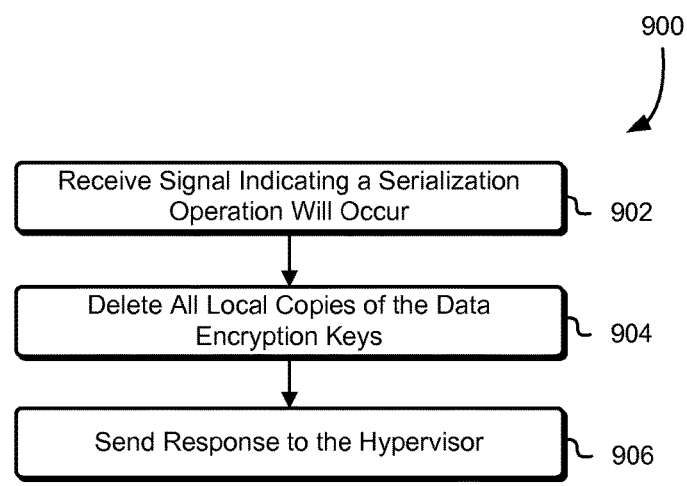
FIG. 9 shows an illustrative example of a process for processing a request in accordance with at least one embodiment.

FIG. 9 shows an illustrative example of process 900 which may be used to prevent exposure of plaintext cryptographic keys. The process 900 may be performed by any suitable system, such as by the device as described in connection with FIG. 3 and/or an appropriate component thereof, such as by the virtual machine 302. Returning to FIG. 9, in an embodiment, the process 900 includes receiving a signal for a hypervisor indicating that a serialization event will occur 902. The signal may be any of the signaling methods or function registrations as described above. Once the signal has been received 902, the instance may delete all local copies of the encryption keys 904 in order to prevent the keys from being stored persistently or transmitted over a network in plaintext form. In various embodiments, other operations may be performed that produce a similar result as deleting the encryption keys. For example, the instance may have previously registered a function (e.g., the delete keys function), the hypervisor may signal the instance 902 by calling the previously registered function. The instance may then perform operations corresponding to the function called by the hypervisor. For example, the instance may request from a security module encryption of one or more keys 904. Other techniques described in the present disclosure may be used to ensure that the plaintext keys are not exposed. For example, the instance may move the keys to the ephemeral area of memory described above, so that the keys are not serialized during execution of the serialization event. Determining the location of the ephemeral area of memory may be accomplished by coordinating the memory location with the hypervisor at some point during execution of the instance. In numerous variations of process 900, the instance may ignore the signal and allow serialization of the instance data without regard to keys that may be stored in memory.

The instance, once the operation has been performed 904, may signal a response 906 to the hypervisor or other system of the service provider indicating that operations to prevent exposure of plaintext keys 904 have been completed and serialization may proceed. In various embodiments, the response 906 may indicate that one or more operations to protect the keys stored in memory have failed and serialization may not proceed. The response 906 may also indicate that more time is required to complete operations to protect the keys stored in memory. The response to the hypervisor 906 may be transmitted using any of the signaling methods as described above. For example, the instance may send an interrupt to the hypervisor through a virtual device driver.

Figure 10:
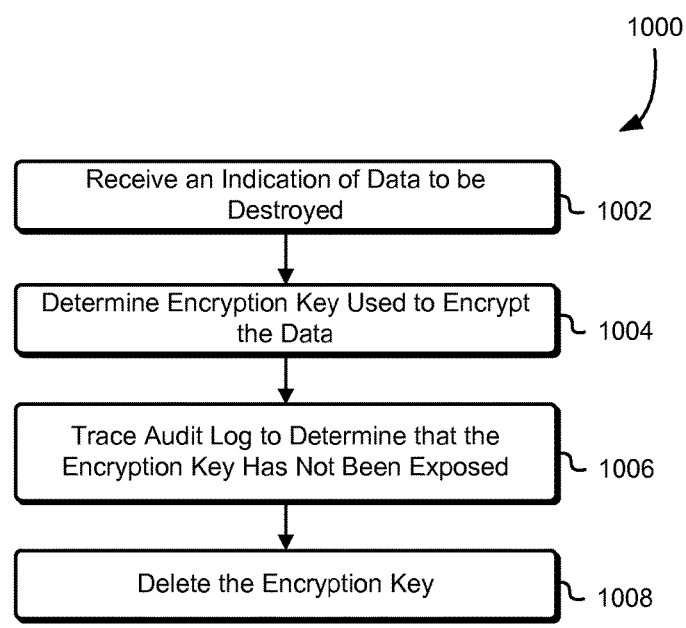
FIG. 10 shows an illustrative example of a process for processing a request in accordance with at least one embodiment.

FIG. 10 shows an illustrative example of process 1000 which may be used to delete or destroy data which has been encrypted with a cryptographic key. The process 1000 may be performed by any suitable system, such as by the device as described in connection with FIG. 3 and/or an appropriate component thereof, such as by the hypervisor 306. Returning to FIG. 10, in an embodiment, the process 1000 includes receiving an indication of data which is to be destroyed 1002. The indication may be received outside of the virtual machine instance, such as at the hypervisor responsible for managing the instance. For example, one or more systems of the service provider may receive a request from a customer and determine, based at least in part on the request, the hypervisor responsible for managing the virtual machine corresponding to the data which is to be destroyed. The request may then be transmitted directly to the hypervisor responsible for the virtual machine instance, without providing the request to the virtual machine instance. The request may then be processed directly by the hypervisor without issuing commands to the virtual machine instance. The indication may include information corresponding to data encryption keys used to encrypt the data, information corresponding to sensitive data or information corresponding to the cryptographic management module controlling the data encryption keys. The indication may be generated by the customer interacting directly with the hypervisor or through a management console, as described above in reference to FIG. 5. In various other embodiments, the indication of data to be deleted includes only information corresponding to the data encryption key which is to be destroyed. Returning to FIG. 10, once an indication of the data to be destroyed has been received, the process 1000 may continue and one or more systems of the service provider, such as the cryptographic key management module, may determine the one or more data encryption keys used to encrypt the data. For example, the cryptographic management module may be queried to determine the data encryption keys used to encrypt data corresponding to the virtual machine requesting the data to be destroyed.

Once the data encryption keys have been determined 1004, an audit log may then be examined to determine that plaintext representations of the data encryption keys have not been exposed. The audit log may be any log information such as the audit log 514 described above in connection with FIG. 5. The audit log may be traced by the virtual machine instance requesting that the data be destroyed. The cryptographic management module controlling the data encryption key, a service of the service provider, the virtual machine instance or some other system suitable for parsing information from an audit log may perform a trace of the audit log. In numerous variations of process 1000, if a trace of the audit log is unable to indicate conclusively that the cryptographic key has not been exposed during operation, a notification may be sent to the customer indicating that the cryptographic key may have been exposed. For example, the audit log may indicate that a serialization event occurred for a particular virtual machine without protecting the cryptographic keys contained in the virtual machine's memory and a message may be sent to the customer indicating that the cryptographic keys may have been exposed during serialization. If a trace of the audit log does not indicate that the encryption keys have not been exposed, the encrypted data may then be deleted directly using any of the techniques described in the present disclosure, such as overwriting the encrypted data with other data.

Returning to FIG. 10, if it is determined that the encryption keys have not been exposed 1006, the keys or other sensitive data may then be selectively deleted or otherwise destroyed 1008. The data may be deleted or otherwise destroyed 1008 by overwriting the keys with random data, non-random data, zeros, ones or other suitable information. For example, if an ephemeral area of memory is used, as described above, the guest operating system may overwrite the memory area with random or non-random information thereby deleting the keys contained in the memory area. The hypervisor or some other system of the service provider may cause the data to be deleted directly from the memory of the virtual machine instance. The hypervisor may also control the virtual machine instance in order to have the virtual machine instance delete the data. For example, the user through the management console may select data to be deleted, one or more systems of the service provider may determine an encryption key used to encrypt the data and the hypervisor may delete the encryption key from the memory of the virtual machine instance associated with the user. In various other embodiments, encryption keys stored in volatile memory may be destroyed by cutting the power to the volatile memory. If the encryption keys are contained in a cryptographic security module, the cryptographic security module may delete the key in accordance with its inherent capabilities. Deleting the encryption key may render the data encrypted with the particular encryption keys indecipherable.

Figure 11:
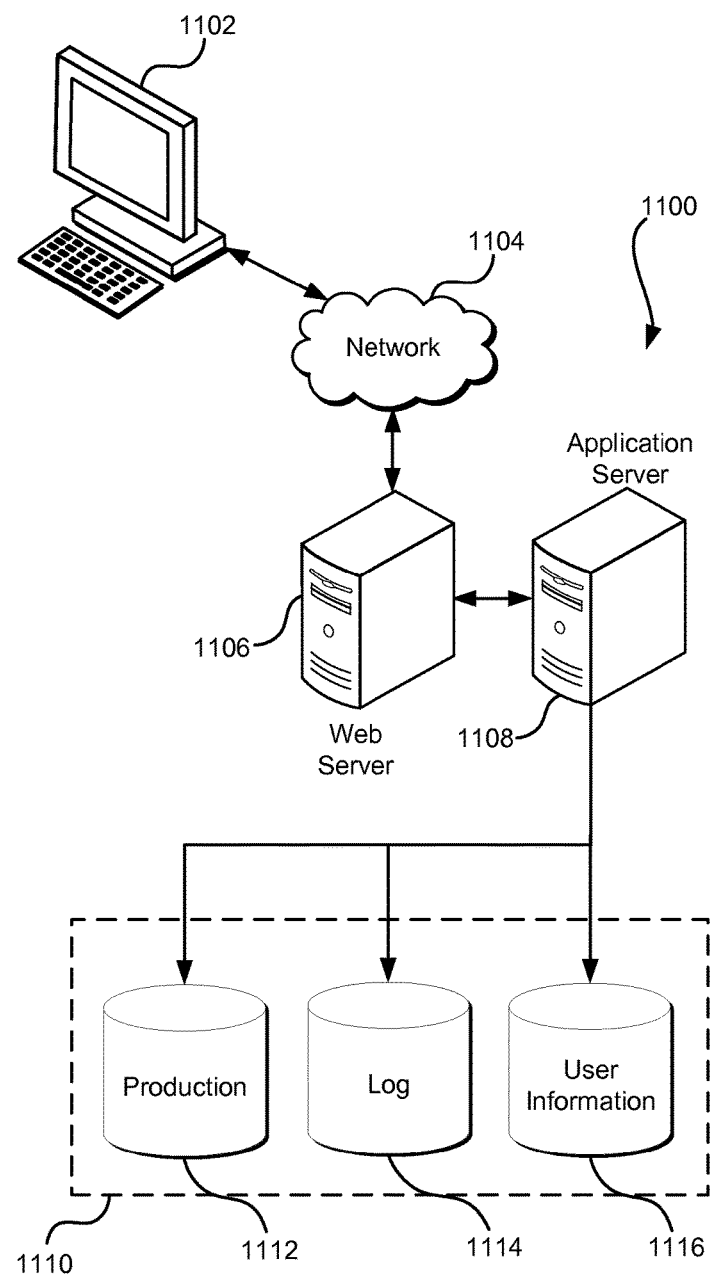
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1110 can include several separate data tables, databases or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, RAM, ROM, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as RAM" or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. One or more non-transitory computer-readable storage media collectively stored thereon instructions that, as a result of being executed by one or more processors of a system, cause the system to:
provide a second computer system using an image of a first computer system, the second computer system instantiated based at least in part on:
detecting a command to serialize the first computer system, the first computer system including computer system memory containing a plaintext representation of a cryptographic key;
generating and storing metadata associated with the cryptographic key, said metadata comprising functions registered by the first computing system, including operations to be performed for restoring the cryptographic key; and
executing the command by at least writing the image of the first computer system to persistent storage such that the image of the first computer system lacks the plaintext representation of the cryptographic key, the image usable to instantiate the first computer system without access to the plaintext representation of the cryptographic key;
perform at least one cryptographic operation based at least in part of the registered functions and operations to be performed for restoring the cryptographic key in the metadata, to cause the second computer system to operate with access to the plaintext representation of the cryptographic key; and
store the plaintext representation of the cryptographic key to memory of the second computer system.

2. The one or more non-transitory computer-readable storage media of claim 1, wherein writing the image of the first computer system to persistent storage such that the image of the first computer system lacks the plaintext representation of the cryptographic key includes deleting the plaintext representation of the cryptographic key before writing the image of the first computer system.

3. The one or more non-transitory computer-readable storage media of claim 1, wherein writing the image of the first computer system to persistent storage such that the image of the first computer system lacks the plaintext representation of the cryptographic key includes generating an audit log and signing the audit log with a service provider private key of a public-private key pair.

4. The one or more non-transitory computer-readable storage media of claim 1, wherein serializing the first computer system includes at least one operation corresponding to migration, suspension, snapshot or storing data persistently.

5. The one or more non-transitory computer-readable storage media of claim 1, wherein writing the image of the first computer system to persistent storage such that the image of the first computer system lacks the plaintext representation of the cryptographic key includes determining a particular area of memory containing the plaintext representation of the cryptographic key and excluding the particular area of memory from being written to the image of the first computer system.

6. The one or more non-transitory computer-readable storage media of claim 1, wherein writing the image of the first computer system to persistent storage such that the image of the first computer system lacks the plaintext representation of the cryptographic key includes requesting encryption of the plaintext representation of the cryptographic key from a cryptographic key management module such that the encrypted representation of the cryptographic key is written to the image of the first computer system.

7. The one or more non-transitory computer-readable storage media of claim 1, writing the image of the first computer system to persistent storage such that the image of the first computer system lacks the plaintext representation of the cryptographic key includes using a first cryptographic key to encrypt the plaintext representation of the cryptographic key.

8. The one or more computer-readable storage media of claim 7, wherein enabling the second computer system to operate with access to the plaintext representation of the cryptographic key includes decrypting the encrypted plaintext representation of the cryptographic key with the first cryptographic key based at least in part on the metadata associated with the image of the first computer system indicating the operations to be performed in order to cause the second computer system to operate with access to the plaintext representation of the cryptographic key.

9. A computer-implemented method for protecting cryptographic keys operated by a computing resource service provider, comprising:
   providing a second computer system using serialized data corresponding to a first computer system, the second computer system instantiated based at least in part on:
   detecting that a serialization event will occur to the first computer system containing one or more plaintext cryptographic keys;
   storing metadata associated with the cryptographic key, the metadata comprising information corresponding to functions registered by the first computer system, including operations to be performed for restoring access to the plaintext representation of the cryptographic key; and
   causing one or more serialization operations corresponding to the serialization event to be performed such that the serialized data corresponding to the first computer system does not contain the one or more plaintext cryptographic keys;
   causing the second computer system to have access to the plaintext cryptographic key after completion of the serialization event based at least in part on at least one operation indicated in the metadata; and
   storing the plaintext cryptographic key on the second computer system.

10. The computer-implemented method of claim 9, wherein the serialization event includes at least one operation corresponding to migration, suspension, snapshot or storing data persistently.

11. The computer-implemented method of claim 9, wherein:
    causing the one or more serialization operations corresponding to the serialization event to be performed includes encrypting with a first cryptographic key the one or more plaintext cryptographic keys; and
    causing the second computer system to have access to the one or more plaintext cryptographic keys after completion of the serialization event includes decrypting with the first cryptographic key the one or more plaintext cryptographic keys based at least in part on the operation indicated in the metadata.

12. The computer-implemented method of claim 9, wherein:
    the first computer system has memory; and
    causing the one or more serialization operations corresponding to the serialization event to be performed such that serialized data corresponding to the first computer system does not contain the one or more plaintext cryptographic keys includes indicating a particular area of the memory containing the one or more plaintext cryptographic keys such that the particular area of the memory will not be serialized as a result of the one or more serialization operations.

13. The computer-implemented method of claim 12, wherein the particular area of memory containing the one or more plaintext cryptographic keys is managed by an operating system of the first computer system such that read access to the one or more plaintext cryptographic keys is restricted.

14. The computer-implemented method of claim 9, wherein causing the second computer system to have access to the one or more plaintext cryptographic keys after completion of the serialization event includes restoring access to the one or more plaintext cryptographic keys based at least in part on the operation indicated in the metadata.

15. The computer-implemented method of claim 9, wherein preventing the one or more plaintext cryptographic keys from being stored into persistent memory includes using a key to encrypt all the data to be serialized.

16. A system, comprising: one or more processors; and memory with instructions that, as a result of being executed by the one or more processors, cause the system to:
    provide a second computer system using an image of a first computer system, the second computer system instantiated based at least in part on:
    for a first computer system that operates with access to a plaintext cryptographic key, serializing the first computer system to obtain the image of the first computer system that lacks the plaintext cryptographic key;
    encrypting the plaintext cryptographic key to generate an encrypted cryptographic key;
    storing metadata associated with the encrypted cryptographic key, said metadata comprising information corresponding to functions registered by the first computer system, including operations to be performed for restoring the cryptographic key; and causing the image of the first computer system to be persistently stored;

decrypt the encrypted plaintext cryptographic key based at least in part on the metadata that indicates registered functions and operations to be performed in order to cause the second computer system to operate with access to the plaintext representation of the cryptographic key; and store the plaintext cryptographic key to memory associated with the second computer system.

17. The system of claim 16, wherein obtaining the image of the first computer system that lacks the plaintext cryptographic key includes creating the image of the first computer system in a manner that excludes a particular area of memory of the first computer system and the first computer system controls access to the particular area of memory.

18. The system of claim 16, wherein obtaining the image of the first computer system that lacks the plaintext cryptographic key includes requesting the encrypted cryptographic key from a key management device.

19. The system of claim 16, wherein obtaining the image of the first computer system that lacks the plaintext cryptographic key includes deleting the plaintext cryptographic key before obtaining the image.

20. The system of claim 16, wherein obtaining the image of the first computer system that lacks the plaintext cryptographic key includes, as a result of expiration of a grace period, performing one or more operations corresponding to obtaining the image of the first computer system.

21. The system of claim 16, wherein obtaining the image of the first computer system that lacks the plaintext cryptographic key includes registering a function with a hypervisor managing the first computer system, the function deleting the plaintext cryptographic key from the first computer system as a result of obtaining the image.

22. The system of claim 21, wherein obtaining the image of the first computer system that lacks the plaintext cryptographic key includes removing access to the plaintext cryptographic key.

* * * * *